United States Patent [19]
Lee

[11] Patent Number: 5,490,101
[45] Date of Patent: Feb. 6, 1996

[54] DIGITAL DATA MULTIPLYING CIRCUIT

[75] Inventor: Chul-ho Lee, Seoul, Rep. of Korea

[73] Assignee: Samsung Electronics Co., Ltd., Suwon, Rep. of Korea

[21] Appl. No.: 195,007

[22] Filed: Feb. 14, 1994

[30] Foreign Application Priority Data

Feb. 12, 1993 [KR] Rep. of Korea .................. 93-1940

[51] Int. Cl.⁶ .................................................. G06F 7/52
[52] U.S. Cl. ....................................... 364/757; 364/760
[58] Field of Search ................................ 364/757, 754, 364/765, 707, 758, 759, 724.15, 724.16

[56] References Cited

U.S. PATENT DOCUMENTS

| | | | |
|---|---|---|---|
| 4,796,216 | 1/1989 | Renner et al. | 364/724.15 |
| 5,166,895 | 11/1992 | Makino | 364/724.16 |
| 5,262,975 | 11/1993 | Ohki | 364/757 |

*Primary Examiner*—Roy N. Envall, Jr.
*Assistant Examiner*—Emmanuel L. Moise
*Attorney, Agent, or Firm*—Cushman Darby & Cushman

[57] ABSTRACT

A digital data multiplying circuit has a double clock alternating sampler for alternately sampling the digital data applied from a plurality of input buses by a time-division system in accordance with a first system clock, a dual coefficient alternating multiplier for alternately multiplying digital data of each bus sampled by the double clock alternate sample with the multiplying coefficient corresponding to the digital data according to a first system clock and first and second primary clocks, and a data restorer for dividing the synchronized product data of the dual coefficient alternating multiplier into input data units according to the first system clock, a second system clock and the second primary clock and for outputting the result on a plurality of output buses. As a result, the digital data input to a plurality of input buses can be multiplied by a single multiplier.

14 Claims, 9 Drawing Sheets

DIGITAL DATA MULTIPLYING CIRCUIT

FIELD OF THE INVENTION

The present invention relates to a digital data multiplying circuit. More particularly, the invention performs a time-division of the digital data input to a plurality of buses and alternately multiplies the digital data using a single multiplier and divides the data into a plurality of buses, thereby reducing chip size.

Recently, digital signal processors have been significantly improved by advancements in computers and VLSI technology. As a result of such developments, conventional analog signal processing techniques are being replaced by digital methods. A single chip can now perform the signal processing once requiring a large computer. Furthermore, in response to the upwardly spiralling demand for compact disc components and high definition television, continued progress in digital signal processor techniques is needed.

In a digital signal processor, a plurality of digital data processing functions are provided for and integrated in a single chip, to thereby greatly contribute to system miniaturization, low power consumption and reduced cost. The present invention involves a hardware-reduced digital data multiplying circuit in which the number of elements is reduced.

BACKGROUND OF THE INVENTION

FIG. 1 is a block diagram showing a conventional digital data multiplying circuit. Conventional multiplier 10 comprises an n×n multiplier A 12 for multiplying n-bit digital data A with an n-bit digital coefficient Ka, and an n×n multiplier B 14 for multiplying n-bit digital data B with an n-bit digital coefficient Kb. Multiplier 10 multiplies the data input via two data buses and two coefficient buses, and respectively outputs the result. As shown in FIG. 1, n×n multiplier A 12 multiplies n-bit digital data A with n-bit digital coefficient Ka and outputs the resulting n-bit product Ka×A, while n×n multiplier B 14 multiplies n-bit digital data B with n-bit digital coefficient Ka and outputs the resulting n-bit product Ka×B. Many gates, however, are needed to realize the above-described n×n multipliers 12 and 14, which occupies excessive chip area when the multiplier is to be realized by a single chip. Specifically, when a digital signal processor using such a multiplier is to be realized by a single chip, the area used on the chip increases with the number of bits n to be multiplied. As a result, manufacturing cost and power consumption are increased and reliability suffers.

Thus, in the prior art, when a data input to a plurality of n-bit digital data buses is multiplied by a coefficient input to another bus, the number of multipliers needed corresponds to the number of input data buses. Therefore, when the multiplier is realized by a single chip, a large chip area is required. As a result, manufacturing cost and power consumption are increased and the reliability is lowered.

SUMMARY OF THE INVENTION

Accordingly, it is an object of the present invention to provide a digital data multiplying circuit which performs time-division multiplexing on n-bit digital data input to a plurality of input buses, thereby sharing multipliers to reduce the number of multipliers and, accordingly, chip size.

To accomplish the above object, there is provided a digital data multiplying circuit for multiplying n-bit digital data inputs applied to a plurality of data input buses with coefficients and for outputting the product thereof, the digital data multiplying circuit comprising:

a double clock alternating sampler for performing alternate sampling, according to a first system clock, on digital data applied from the plurality of input buses;

a dual coefficient alternating multiplier for alternately multiplying the digital data of each bus sampled by the double clock alternating sampler with coefficients which correspond to the sampled digital data, according to a first system clock and first and second primary clocks; and a data restorer for dividing the product data of the dual coefficient alternating multiplier into respective digital data outputs according to the first system clock and a second system clock and to the second primary clock and for outputting onto a plurality of output buses.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

The present invention will now be explained in detail with reference to the attached drawings.

Figure 1:
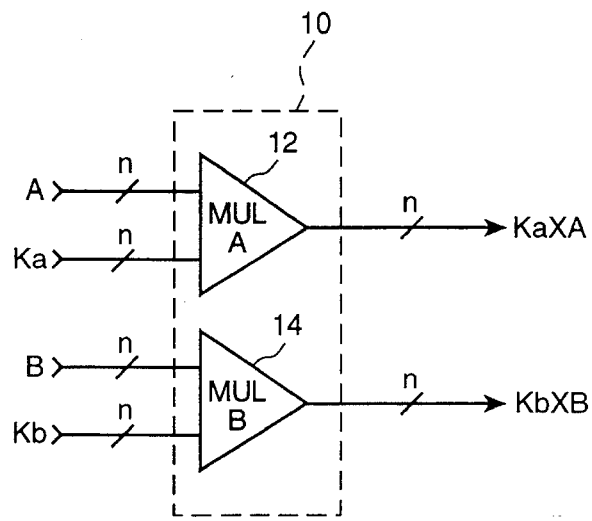
FIG. 1 is a block diagram showing a conventional digital data multiplier.
Figure 2:
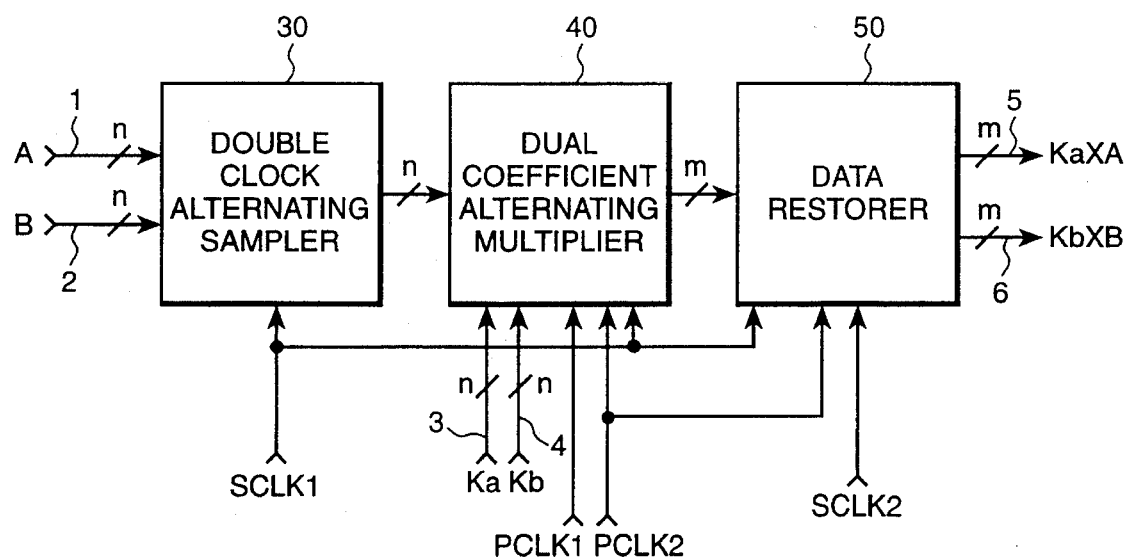
FIG. 2 is a schematic structural diagram showing a digital data multiplying circuit according to the present invention.

FIG. 2 is a schematic block diagram showing the digital data multiplying circuit of the present invention. The circuit includes double clock alternating sampler 30, dual coefficient alternating multiplier 40, and data restorer 50. In operation, in accordance with a first system clock SCLK1, double clock alternating sampler 30 samples n-bit digital data A which is input to a first input bus and n-bit digital data B which is input to a second input bus 2. Then, double clock alternating sampler 30 outputs the results onto a single n-bit bus.

In dual coefficient alternating multiplier 40 the digital data of each bus sampled by double clock alternating sampler 30 and the respective coefficient of the digital data are alternately multiplied, in accordance with the first system clock SCLK1 and first and second primary clocks PCLK1 and PCLK2. That is, n-bit digital data A is multiplied with n-bit coefficient Ka, which results in m-bit product data Ka×A. The n-bit digital data B is multiplied with n-bit coefficient Kb, which results in m-bit product data Kb×B.

In data restorer 50, each product data output from dual coefficient alternating multiplier 40, which has been multiplexed and output to an m-bit bus, is divided in accordance with first and second system clocks SCLK1 and SCLK2 and second primary clock PCLK2. Then, m-bit product data Ka×A is output onto a first output bus 5 and m-bit product data Kb×B is output onto a second output bus 6. The system clock used in the present invention is adopted by a dual phase system. Each pair of clocks, i.e., first system clock SCLK1 & second system clock SCLK2 and first primary clock PCLK1 & second primary clock PCLK2, have a non-overlap relationship.

Figure 3:
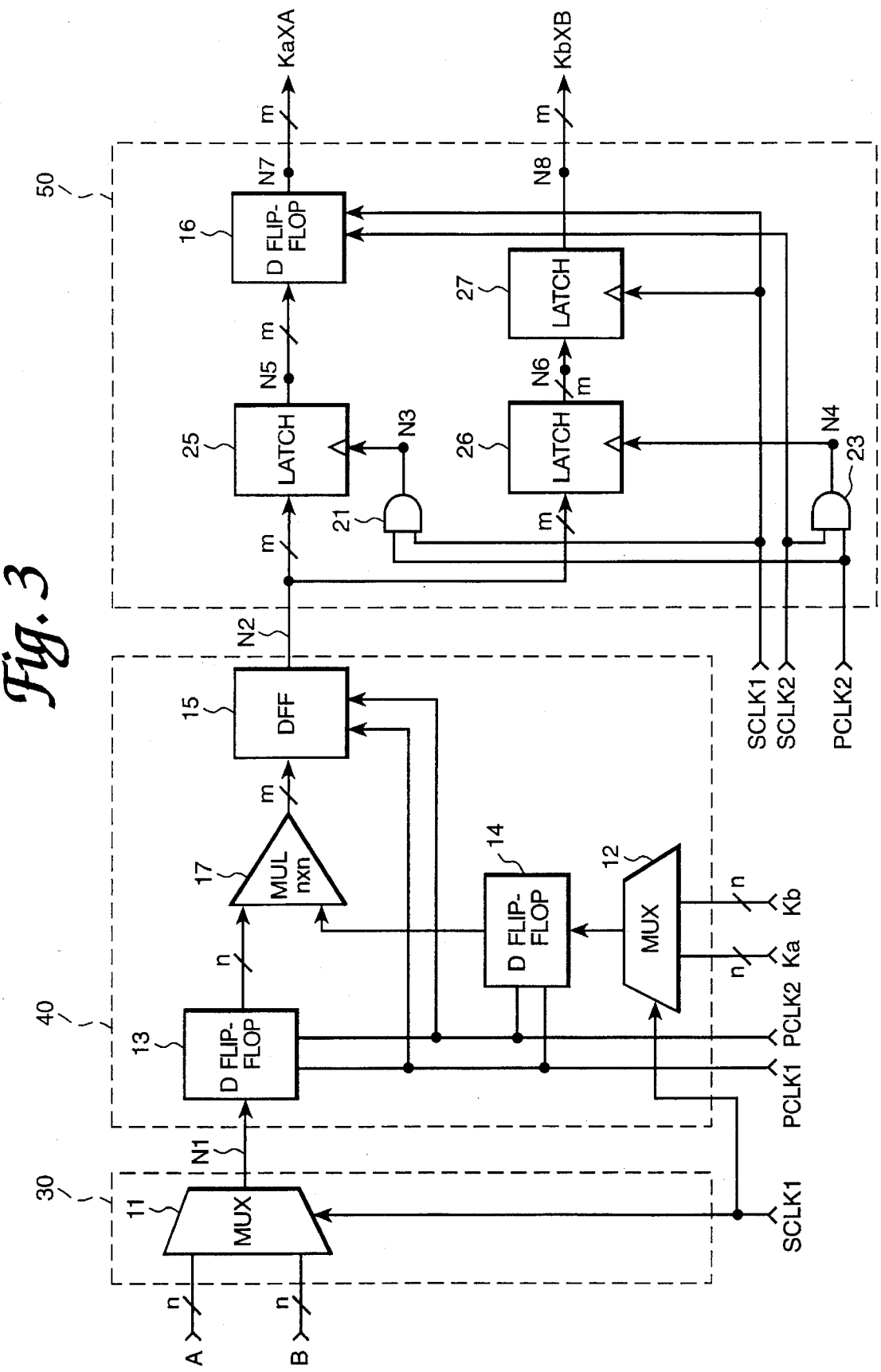
FIG. 3 is a block diagram showing one embodiment of the digital data multiplying circuit of FIG. 2.
Figure 5:
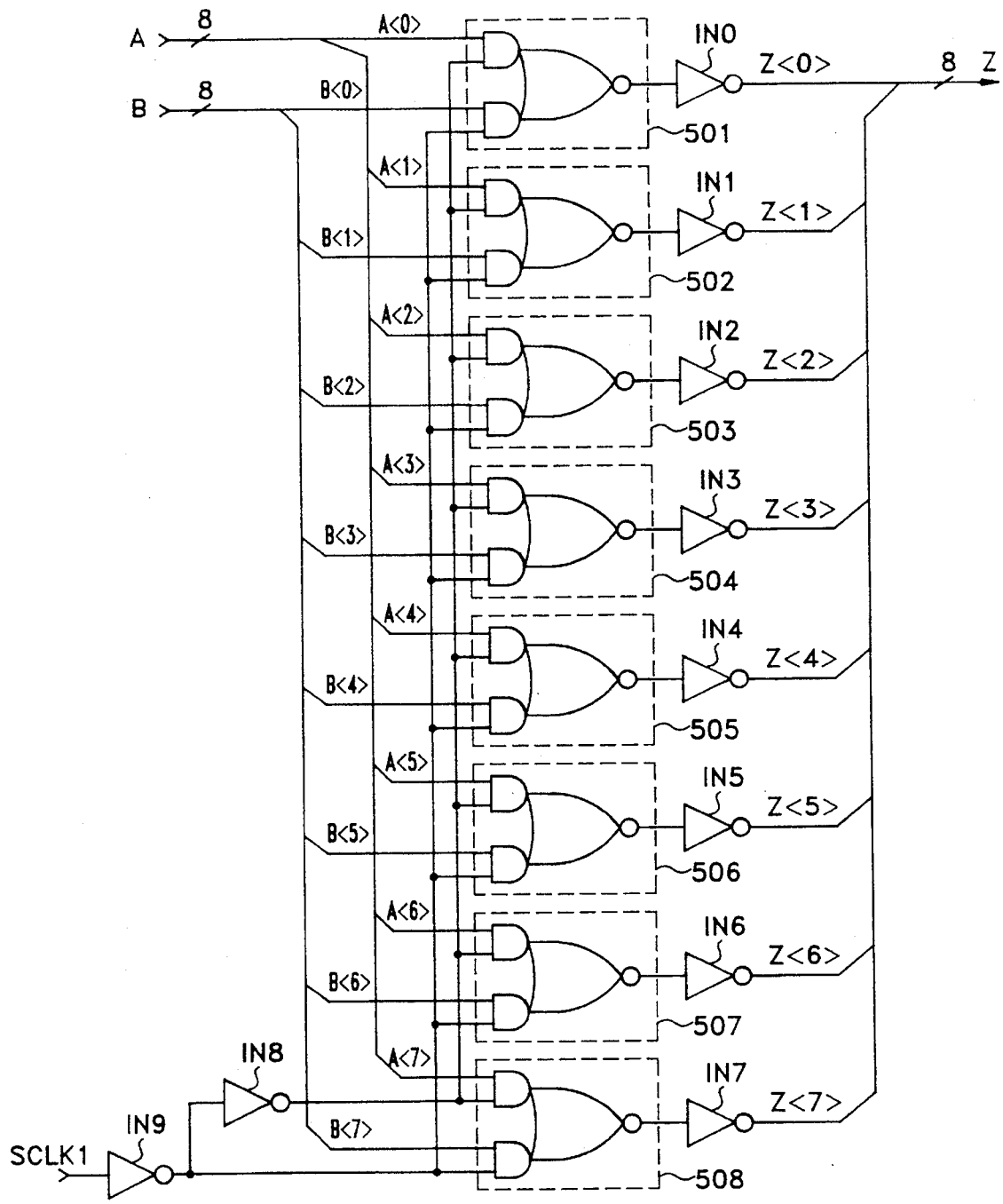
FIG. 5 is a detailed circuit diagram showing the multiplexer of the circuit shown in FIG. 3.

FIG. 3 is a block diagram showing one embodiment of the digital data multiplying circuit of FIG. 2. As shown in FIG. 3, double clock alternating sampler 30 comprises first multiplexer 11. The n-bit input data A and n-bit input data B are sampled in accordance with first system clock SCLK1 and the result is output. FIG. 5 is a detailed circuit diagram of n-bit first multiplexer 11 (hereinafter, n equals 8 in the preferred embodiment of the present invention). The digital data respectively input onto input buses A (bits 0 to 7) and B (bits 0 to 7) are sampled according to first system clock SCLK1, and the result is output onto an output bus Z (bits 0 to 7). First multiplexer 11 comprises a plurality of logic gates 501 to 508 respectively connected in parallel to the two digital data input buses A and B and to first system clock SCLK1. A plurality of inverters IN0 to IN7 are connected to the output lines of logic gates 501 to 508, respectively. First system clock SCLK1 is connected to input terminals of the plurality of logic gates 501 to 508 at different levels via inverters IN8 and IN9. Accordingly, first multiplexer 11 is able to output the data alternately sampled onto a single output bus Z.

As shown in FIG. 3, dual coefficient alternating multiplier 40 comprises a second multiplexer 12 for alternately sampling a plurality of n-bit coefficients Ka and Kb, which correspond to the coefficient digital data, in accordance with first system clock SCLK1. First and second D flip-flops 13 and 14 are provided for delaying for a predetermined time the coefficient digital data, alternately sampled via second multiplexer 12, and also for delaying for a predetermined time the digital data alternately sampled via first multiplexer 11, in accordance with first and second primary clocks PCLK1 and PCLK2. An n×n parallel multiplier 17 is provided for, respectively and alternately, multiplying the delayed coefficient digital data with the delayed digital data. A third D flip-flop 15 is provided for delaying the m-bit digital data multiplied in n×n parallel multiplier 17, in accordance with first and second primary clocks PCLK1 and PCLK2.

Figure 6:
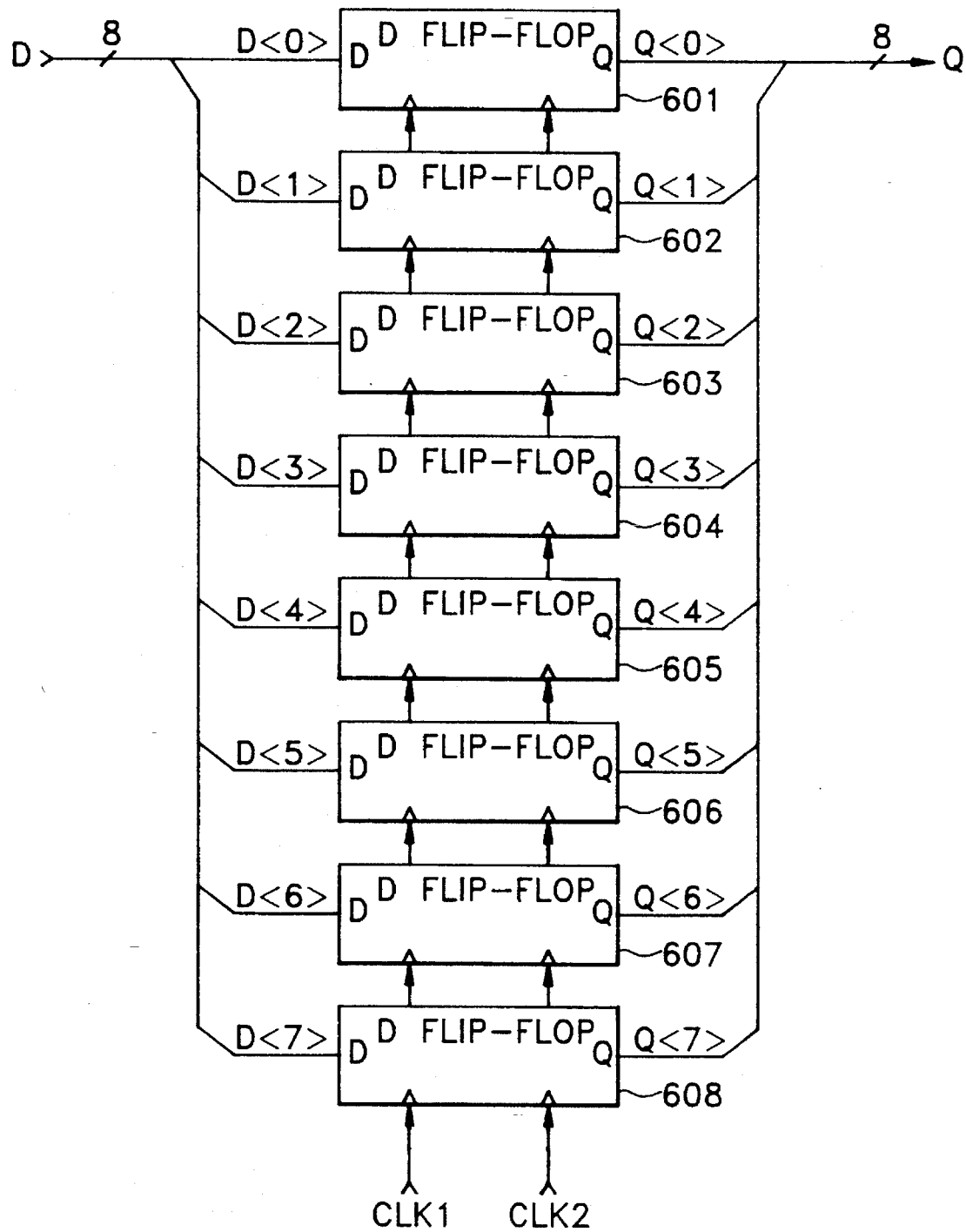
FIG. 6 is a detailed circuit diagram showing the D flip-flop of the circuit shown in FIG. 3.
Figure 8:
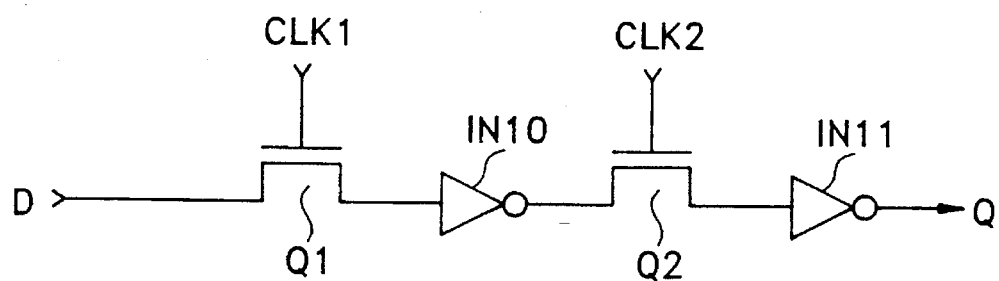
FIG. 8 is a detailed circuit diagram showing the unit D flip-flop shown in FIG. 6.
Figure 10:
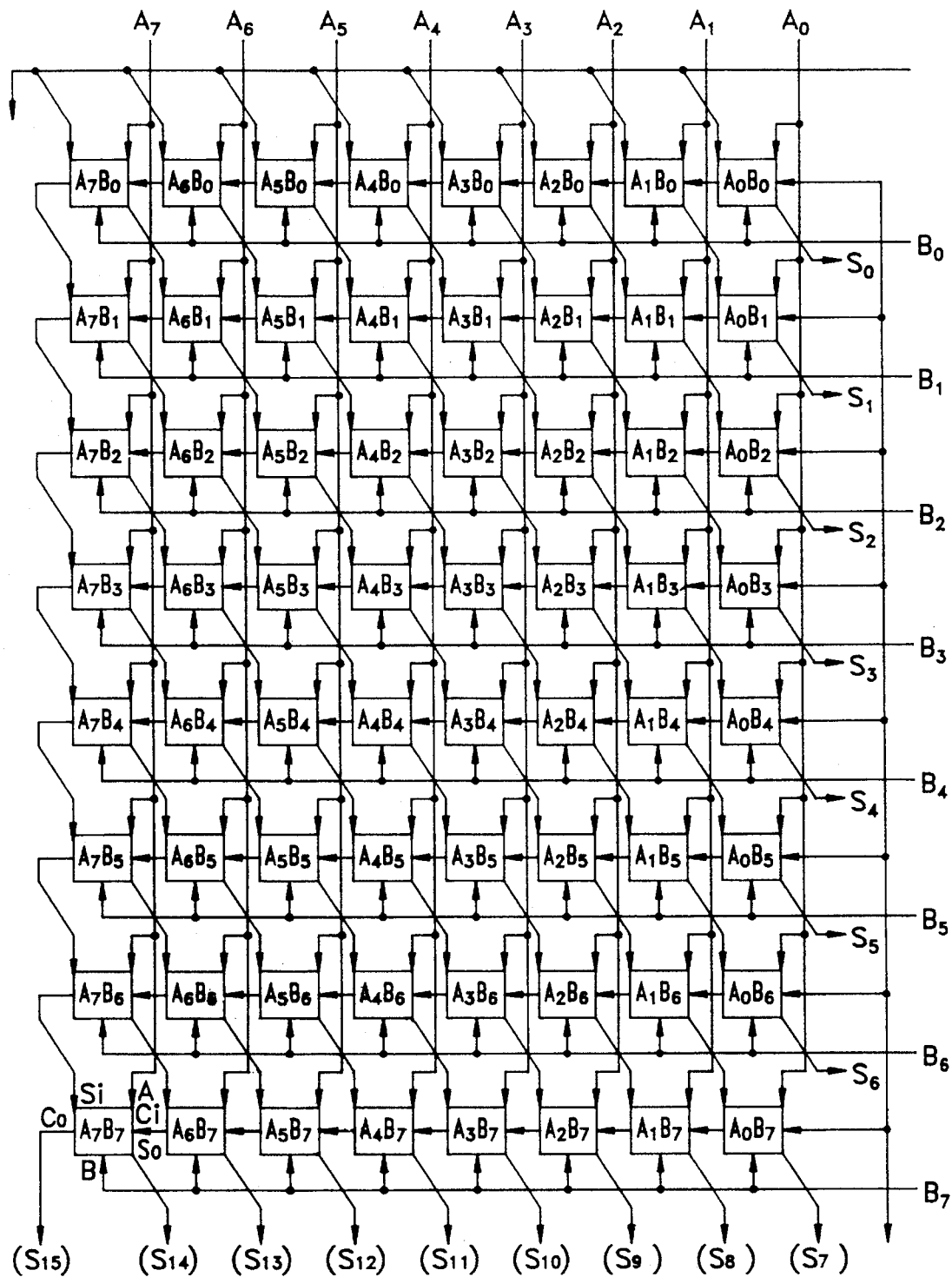
FIG. 10 is a structural diagram of the n×n parallel multiplier of the circuit shown in FIG. 3.

The structure of first, second and third D flip-flops 13, 14 and 15 is shown in FIG. 6. Each one of the D flip-flops is connected in parallel to an n-bit digital data input bus D (bits 0 to 7) and to an output bus Q (bits 0 to 7) by D flip-flop elements 601 to 608, so that the n-bit digital data can be operated in accordance with two clock signals CLK1 and CLK2. As shown in FIG. 8, each flip-flop element comprises two NMOS transistors Q1 and Q2 and two inverters IN10 and IN11 coupled in series. As shown in FIG. 10, n×n parallel multiplier 17 has digital data input buses A and B, each consisting of eight lines. Multiplier 17 comprises an 8×8 full-adder array so as to have eight carry input (Ci) lines, eight carry output (Co) lines, eight sum input lines (Si) and sixteen sum output lines (So).

Figure 11A:
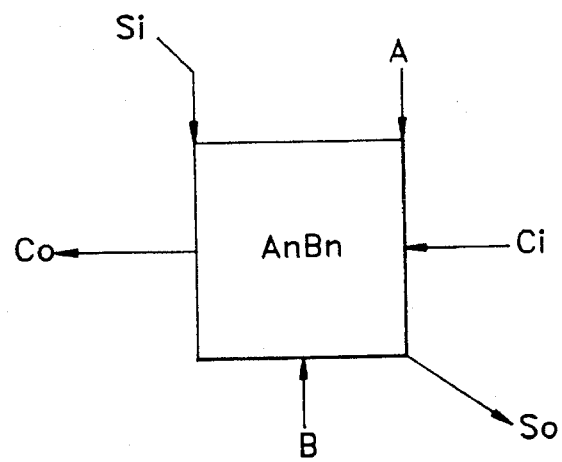
FIG. 11A is an extracted diagram showing the full adder of FIG. 10.
Figure 11B:
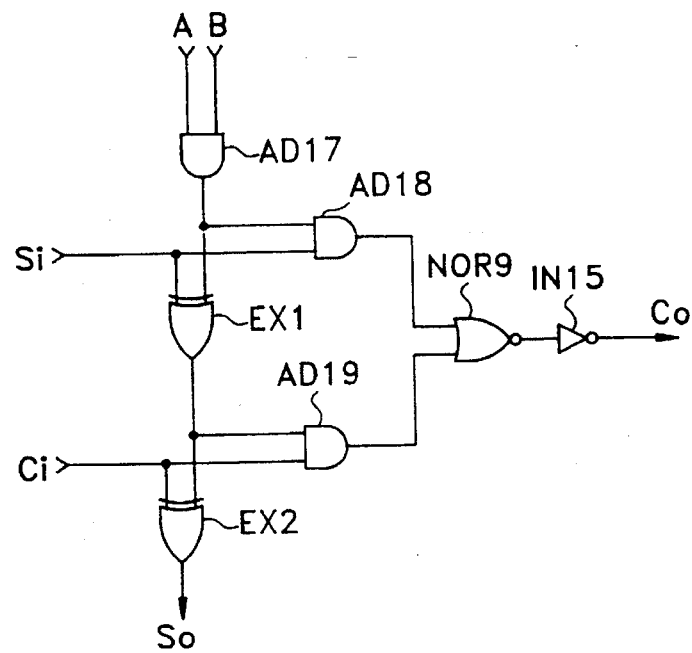
FIG. 11B is a detailed circuit diagram of the full adder shown in FIG. 11A.
Figure 12:
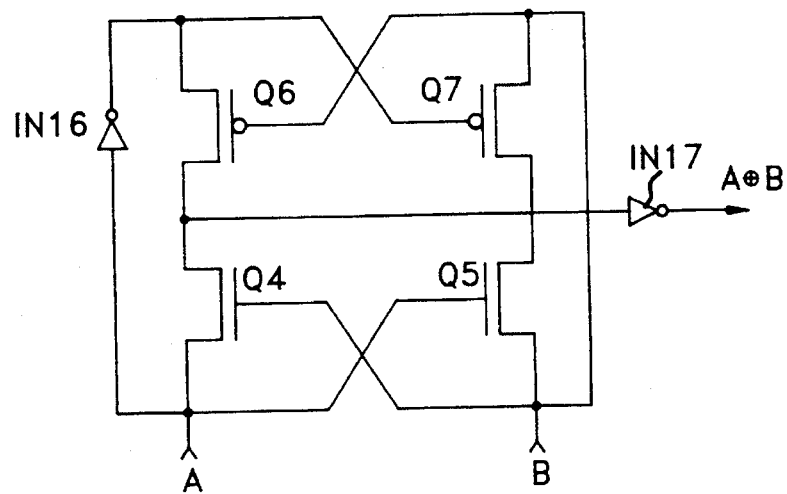
FIG. 12 is a detailed circuit diagram of an exclusive OR circuit of the full adder shown in FIG. 11B.

As shown in FIGS. 11A to 11B, a full-adder cell $A_n B_n$ constituting the parallel multiplier of FIG. 10 sums the corresponding bits of data A and B and a carry input (Ci) and a sum input (Si), and generates a sum output (So) and a carry output (Co). The full-adder cell comprises: first AND gate AD17 for receiving A and B digital data, for performing an AND operation thereto, and for outputting the result; first exclusive OR gate EX1 for exclusively and logically summing the output of AND gate AD17 and a sum input (Si) and for outputting the result; second exclusive OR gate EX2 for exclusively and logically summing the output of first exclusive OR gate EX1 and a carry input (Ci) and for outputting the result; second and third AND gates AD18 and AD19 for respectively and logically producing the outputs of sum input (Si) and AND gate AD17 and of carry input (Ci) and exclusive OR gate EX1 and for outputting the result; NOR gate NOR9 for performing a logical NOR operation on the outputs of AND gates AD18 and AD19 and for outputting the result; and inverter IN15 for inverting the output of NOR gate NOR9 and for outputting the result. In addition, as shown in FIG. 12, exclusive OR gates EX1 and EX2 each comprise a pair of PMOS transistors Q6 and Q7, and a pair of NMOS transistors Q4 and Q5 which are connected to the two input buses A and B, a first inverter IN17 connected to the intermediate nodes between the above pairs of PMOS and NMOS transistors, and a second inverter IN16 connected to the drain of PMOS transistor Q6 and to the source of NMOS transistor Q4. Accordingly, dual coefficient alternating multiplier 40 alternately multiplies the digital data alternately sampled via first multiplexer 11 of double clock alternating sampler 30 with coefficients Ka and Kb and outputs the result.

Data restorer 50 inputs m-bit product data Ka×A and Kb×B, delayed by D flip-flop 15, synchronizes the input data respectively with system clocks, and outputs the result.

Data restorer 50 comprises first latch 25 for receiving the output of dual coefficient alternating multiplier 40 and for latching the product data according to the clock signal, which is logically multiplied in AND gate 21, using first system clock SCLK1 and second primary clock PCLK2. Second latch 26 is used for receiving the output of dual coefficient alternating multiplier 40 and for latching the product data according to the clock signal, which is logically multiplied in AND gate 23, using second system clock SCLK2 and second primary clock PCLK2. D flip-flop 16 is used for synchronizing the output of first latch 25 with first and second system clocks SCLK1 and SCLK2, and a third latch 27 is used for synchronizing the output of second latch 26 with first system clock SCLK1. Therefore, the output of dual coefficient alternating multiplier 40 is respectively output to the two output buses 5 and 6 (FIG. 2).

Figure 7:
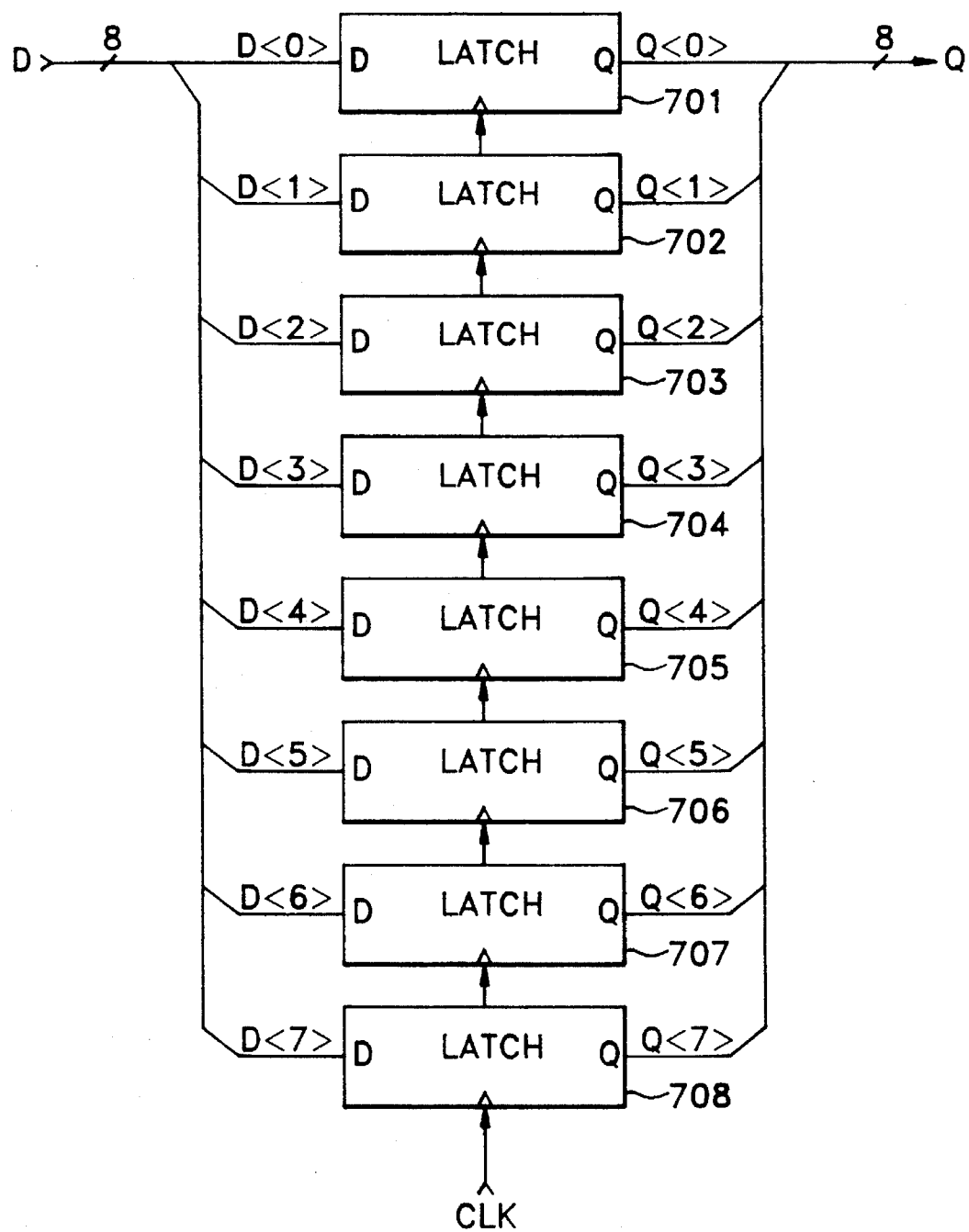
FIG. 7 is a detailed circuit diagram showing the latch of the circuit shown in FIG. 3.
Figure 9:
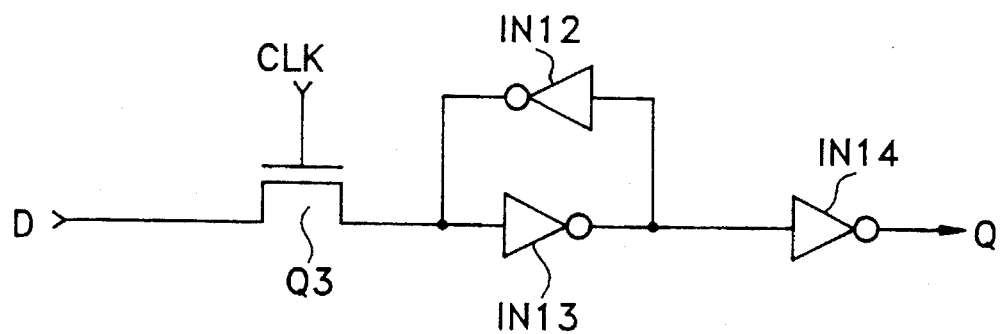
FIG. 9 is a detailed circuit diagram showing the unit latch shown in FIG. 7.

As shown in FIG. 7, m-bit latch circuits 25, 26 and 27 each connect latch circuits 701 to 708 to m-bit digital data input bus D and to output bus Q so that the m-bit digital data which is delayed and output via D flip-flop 15 of dual coefficient alternating multiplier 40 can operate in accordance with one clock signal (CLK). As shown in FIG. 9, each of the above latch circuits comprises a latch cell which includes one NMOS transistor Q3, CMOS inverters IN12 and IN13 connected in parallel to the source of NMOS transistor Q3 and another CMOS inverter IN14 serially connected to CMOS inverters IN12 and IN13.

Operation of the thus constructed digital multiplying circuit of FIG. 3 will now be explained in more detail with reference to the timing diagram shown in FIGS. 4A to 4N.

Figure 4:
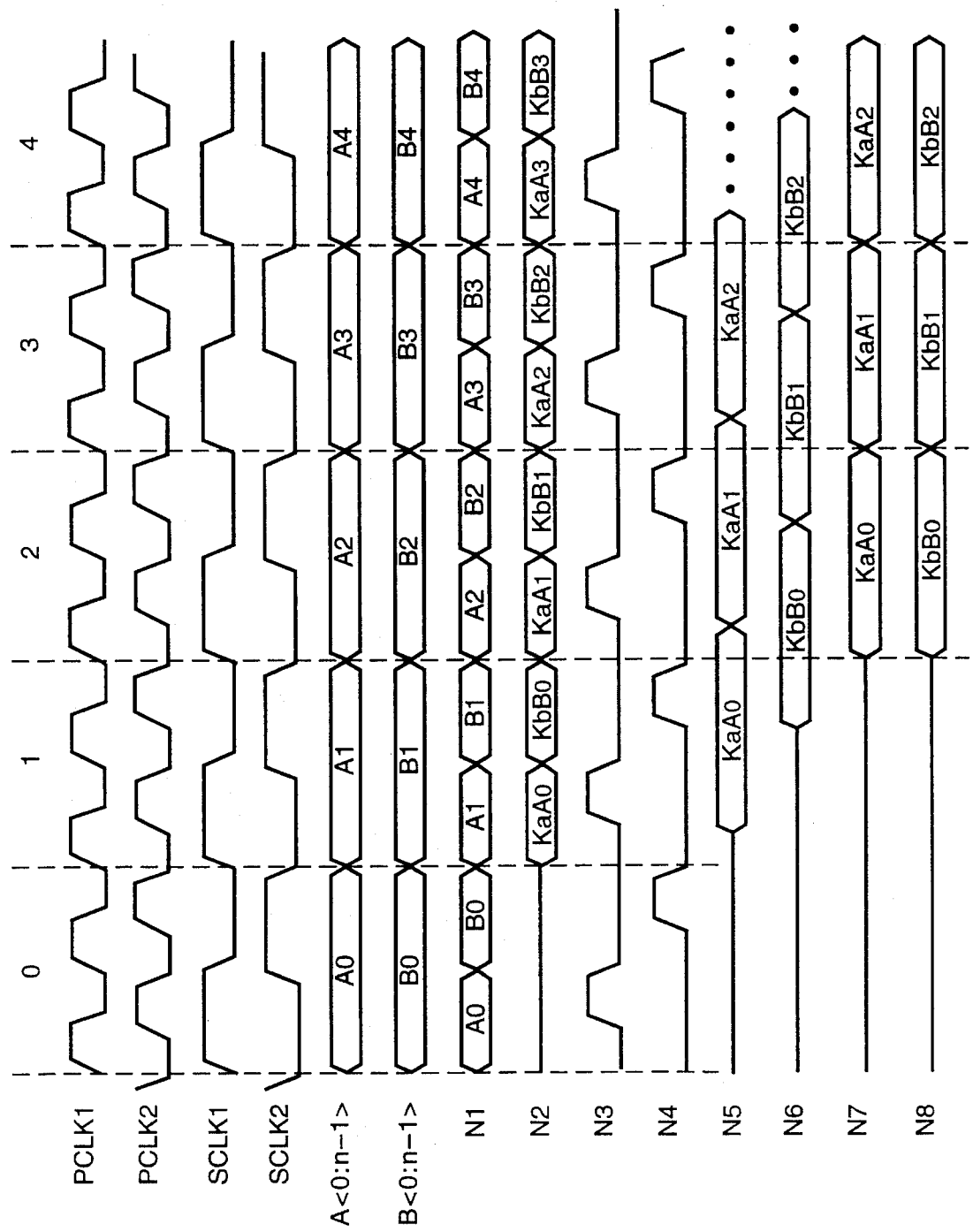
FIGS. 4A to 4N are timing diagrams showing the features of input or output signals of each block of the circuit shown in FIG. 3.

In FIG. 4A to FIG. 4N, N1 to N8 designate nodes, and numerals 0 to 4 indicate timing periods in which each data input, coefficient and multiplied result are synchronized with a system clock cycle and sequentially processed.

First, n-bit digital data A and B, which are to be multiplied, are applied to the data input buses as shown in FIG. 4E and FIG. 4F and n-bit digital data inputs A and B are synchronized with first system clock SCLK1 of FIG. 4C and are alternately sampled. Then, as shown in FIG. 4G, the two data inputs A and B are sampled according to each cycle of first system clock SCLK 1 and the result is output to node N1 of FIG. 3. As shown in FIG. 5, each n-bit digital data input is respectively input to logic gates 501 to 508 and sampled according to first system clock SCLK1, and output via inverters IN0 to IN7. As an example of such sampling, "A" data is output when first system clock SCLK1 is "high" and "B" data is output when first system clock SCLK1 is "low". Accordingly, the sequentially and alternately sampled digital data shown in FIG. 4G, is output.

Here, the first system clock SCLK1 described above and a second system clock SCLK2 which will be described later, operate in the dual phase non-overlap relationship as shown in FIG. 4C and FIG. 4D. Then, the alternately sampled digital data is first applied to first D flip-flop 13 of dual coefficient alternating multiplier 40 and delayed by a predetermined time in accordance with first and second primary clocks PCLK1 and PCLK2. Here, it should be noted that the primary clocks are frequency-doubled clocks of the system clocks, respectively, as shown in FIG. 4A and FIG. 4B, and operate in a dual phase non-overlap relationship as well. Then, after coefficients Ka and Kb are input to the two coefficient input buses and sampled alternately and output, the coefficients are delayed by a predetermined time via second D flip-flop 14 according to first and second primary clocks PCLK1 and PCLK2.

The thus-delayed n-bit digital data A and B and the n-bit coefficient Ka and Kb are respectively and alternately multiplied in n×n parallel multiplier 17. In the multiplication process, as shown in FIG. 10, the alternately sampled digital data is respectively input to bus A (A0 to A7) and bus B (B0 to B7), and the input data is output via sixteen sum output buses S0 to S15.

At this time, each full-adder cell of n×n parallel multiplier 17 is shown in FIG. 11A and detailed in FIG. 11B, and FIG. 12 is a detailed circuit view of the exclusive OR gates EX1 and EX2 among the components of the cell. The exclusive OR gates EX1 and EX2 output a logic "high" when the signals input to the A and B terminals have different levels, and output a logic "low" when the signals have the same level.

The m-bit product data which is obtained by n×n parallel multiplier 17 is delayed by D flip-flop 15 according to first and second primary clocks PCLK1 and PCLK2, and is output to node N2 according to a timing shown in FIG. 4H. In addition, the data output from node N2 is respectively applied to first latch 25 and to second latch 26 of data restorer 50. Here, the clock applied to first latch 25 is an AND clock where first system clock SCLK1 and second primary clock PCLK2 are logically multiplied. The AND clock appears at node N3 in the waveform shown in FIG. 4I. Thus, the clock input to first latch 25 has a timing such that only product data Ka×A is latched.

In addition, the clock applied to second latch 26 is an AND clock where second system clock SCLK2 and second primary clock PCLK2 are logically multiplied and is shown in FIG. 4J. Thus, the clock input from node N4 to second latch 26 has a timing such that only product data Kb×B is latched. At this time, the clock respectively applied to first and second latches 25 and 26 is the same as the clocks applied to FIG. 6 to FIG. 9, and the product data applied to input bus D is output to output bus Q via m-bit latches 701 to 708. Accordingly, as shown in FIG. 4K, data latched in first latch 25 is the product data latched according to the clock (N3) of FIG. 4I and appearing at node N5. Further, as shown in FIG. 4L, data latched in second latch 26 is the product data latched according to the clock (N4) of FIG. 4J, and appearing at node N6.

In addition, the outputs of node N5 and N6 require synchronization in accordance with first and second system clocks SCLK1 and SCLK2. First, as shown in FIG. 4M, the output of node N5 is delayed in D flip-flop 16 in accordance with first and second system clocks SCLK1 and SCLK2 and is output to node N7. Thus, m-bit digital data Ka×A restored through output bus of data restorer 50 can be obtained. Then, the output of node N6 is latched in third latch 27 according to first system clock SCLK1 and is output to node N8, as shown in FIG. 4N. Thus, m-bit digital data Kb×B restored through the output bus of data restorer 50 can be obtained.

When a digital data multiplying circuit of the present invention is used as described above, digital data can be multiplied using a single multiplier, differently from the conventional method where the two 8-bit data inputs are respectively multiplied with coefficients using two multipliers. Therefore, approximately 902 NMOS transistors and 990 PMOS transistors can be eliminated when designing a multiplying circuit. In addition, the above-described digital data multiplying circuit contributes to a hardware reduction, which reduces power consumption and cost. The circuit can be utilized in camcorder, VCR, television and audio products. Accordingly, a digital data multiplying circuit of the present invention can be applied to any digital signal processor which requires a multiplication operation.

It is to be understood that changes and variations may be made without departing from the spirit or scope of the following claims.

What is claimed is:

1. A digital data multiplying circuit for multiplying n-bit digital data applied to a plurality of digital data input buses with a respective plurality of coefficients applied to a plurality of coefficient input buses, and for outputting the products thereof, said digital data multiplying circuit comprising:

double clock alternating sampler means for performing alternate sampling, according to a first system clock, on digital data applied from said plurality of digital data input buses, and for outputting said alternately sampled digital data as alternately sampled digital data;

dual coefficient alternating multiplier means for alternately multiplying said alternately sampled digital data output by said double clock alternating sampler means with said respective plurality of coefficients, according to said first system clock, a first primary clock, and a second primary clock, and for outputting said alternately multiplied alternately sampled digital data as product data; and data restorer means for dividing said product data output by said dual coefficient alternating multiplier means into respective multiplied digital data outputs according to said first system clock, a second system clock, and said second primary clock, and for outputting said respective multiplied digital data onto a plurality of output buses.

2. A digital data multiplying circuit according to claim 1, wherein said double clock alternating sampler means comprises a first multiplexer.

3. A digital data multiplying circuit according to claim 2, wherein said multiplexer comprises:

a plurality of logic gates respectively connected to said plurality of digital data input buses and to a first system clock input line in parallel;

a plurality of inverters connected to output lines of said plurality of logic gates;

said multiplexer thereby outputting said alternately sampled digital data onto a single output bus serially.

4. A digital data multiplying circuit according to claim 2, wherein said dual coefficient alternating multiplier means comprises:

a second multiplexer receiving said plurality of coefficients corresponding to said digital data in accordance with said first system clock, and alternately sampling said plurality of coefficients;

first and second D flip-flops delaying said alternately sampled plurality of coefficients via said second multiplexer and said alternately sampled digital data via said double clock alternating sampler means, respectively, according to said first primary clock and said second primary clock by a predetermined period;

an n×n parallel multiplier respectively and alternately multiplying said alternately sampled plurality of coefficients and said digital data delayed by said first and second D flip-flops; and a third D flip-flop delaying said respectively and alternately multiplied alternately sampled plurality of coefficients and said digital data multiplied in said n×n parallel multiplier in accordance with said first primary clock and said second primary clock.

5. A digital data multiplying circuit according to claim 4, wherein said n×n parallel multiplier comprises an 8×8 full-adder array.

6. A digital data multiplying circuit according to claim 5, wherein said 8×8 full-adder array comprises:

a first AND gate receiving said digital data, performing a logical AND operation on said digital data, and outputting a first AND result;

a first exclusive OR gate exclusively and logically ORing said first AND result and a sum input, and outputting a first exclusive OR result;

a second exclusive OR gate exclusively and logically ORing said first exclusive OR result and a carry input, and outputting a sum result;

a second AND gate logically ANDing said sum input and said first AND result, and outputting a second AND result;

a third AND gate logically ANDing said carry input and said first exclusive OR result, and outputting a third AND result;

a NOR gate logical NORing said second and third AND results, and outputting a NOR result; and an inverter inverting said NOR result, and outputting a multiplied result.

7. A digital data multiplying circuit according to claim 1, wherein said data restorer means comprises:

a first latch receiving said product data output by said dual coefficient alternating multiplier means, and for latching and outputting said product data as first latched product data in accordance with a first latch clock signal obtained by ANDing said first system clock and said second primary clock;

a second latch receiving said product data output by said dual coefficient alternating multiplier means, and for latching and outputting said product data as second latched product data in accordance with a second latch clock signal obtained by ANDing said second system clock and said second primary clock;

a D-flip-flop delaying said first latched product data in accordance with said first system clock and said second system clock; and a third latch delaying said second latched product data in accordance with said first system clock.

8. A digital data multiplying circuit for multiplying n-bit digital data applied to a plurality of digital data input buses with a respective plurality of coefficients applied to a plurality of coefficient input buses, and for outputting the products thereof, said digital data multiplying circuit comprising:

a double clock alternating sampler which alternately samples digital data applied from said plurality of digital data input buses according to a first system clock, and which outputs said alternately sampled digital data as alternately sampled digital data;

a dual coefficient alternating multiplier which alternately multiplies said alternately sampled digital data output by said double clock alternating sampler with said respective plurality of coefficients, according to said first system clock, a first primary clock, and a second primary clock, and which outputs said alternately multiplied alternately sampled digital data as product data; and a data restorer which divides said product data output by said dual coefficient alternating multiplier into respective multiplied digital data outputs according to said first system clock, a second system clock, and said second primary clock, and which outputs said respective multiplied digital data onto a plurality of output buses.

9. A digital data multiplying circuit according to claim 8, wherein said double clock alternating sampler comprises a first multiplexer.

10. A digital data multiplying circuit according to claim 9, wherein said multiplexer comprises:

a plurality of logic gates respectively connected to said plurality of digital data input buses and to a first system clock input line in parallel;

a plurality of inverters connected to output lines of said plurality of logic gates;

said multiplexer thereby outputting said alternately sampled digital data onto a single output bus serially.

11. A digital data multiplying circuit according to claim 9, wherein said dual coefficient alternating multiplier comprises:

a second multiplexer receiving said plurality of coefficients corresponding to said digital data in accordance with said first system clock, and alternately sampling said plurality of coefficients;

first and second D flip-flops delaying said alternately sampled plurality of coefficients via said second multiplexer and said alternately sampled digital data via said double clock alternating sampler, respectively, according to said first primary clock and said second primary clock by a predetermined period;

an n×n parallel multiplier respectively and alternately multiplying said alternately sampled plurality of coefficients and said digital data delayed by said first and second D flip-flops; and a third D flip-flop delaying said respectively and alternately multiplied alternately sampled plurality of coefficients and said digital data multiplied in said n×n parallel multiplier in accordance with said first primary clock and said second primary clock.

12. A digital data multiplying circuit according to claim 11, wherein said n×n parallel multiplier comprises an 8×8 full-adder array.

13. A digital data multiplying circuit according to claim 12, wherein said 8×8 full-adder array comprises:

a first AND gate receiving said digital data, performing a logical AND operation on said digital data, and outputting a first AND result;

a first exclusive OR gate exclusively and logically ORing said first AND result and a sum input, and outputting a first exclusive OR result;

a second exclusive OR gate exclusively and logically ORing said first exclusive OR result and a carry input, and outputting a sum result;

a second AND gate logically ANDing said sum input and said first AND result, and outputting a second AND result;

a third AND gate logically ANDing said carry input and said first exclusive OR result, and outputting a third AND result;

a NOR gate logical NORing said second and third AND results, and outputting a NOR result; and an inverter inverting said NOR result, and outputting a multiplied result.

14. A digital multiplying circuit according to claim 8, wherein said data restorer comprises:

a first latch which receives said product data output by said dual coefficient alternating multiplier, and which latches and outputs said product data as first latched product data in accordance with a first latch clock signal obtained by ANDing said first system clock and said second primary clock;

a second latch which receives said product data output by said dual coefficient alternating multiplier, and which latches and outputs said product data as second latched product data in accordance with a second latch clock signal obtained by ANDing said second system clock and said second primary clock;

a D-flip-flop delaying said first latched product data in accordance with said first system clock and said second system clock; and a third latch delaying said second latched product data in accordance with said first system clock.

* * * * *